(12) United States Patent
Takama

(10) Patent No.: US 10,742,852 B2
(45) Date of Patent: Aug. 11, 2020

(54) IMAGE PROCESSING APPARATUS, OBJECT SHAPE ESTIMATION METHOD, AND STORAGE MEDIUM

(71) Applicant: CANON KABUSHIKI KAISHA, Tokyo (JP)

(72) Inventor: Yasufumi Takama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 116 days.

(21) Appl. No.: 16/000,250

(22) Filed: Jun. 5, 2018

(65) Prior Publication Data

US 2018/0367709 A1 Dec. 20, 2018

(30) Foreign Application Priority Data

Jun. 15, 2017 (JP) .................................. 2017-117813

(51) Int. Cl.

| | |
|---|---|
| G06K 9/00 | (2006.01) |
| H04N 5/222 | (2006.01) |
| H04N 5/232 | (2006.01) |
| G06T 7/292 | (2017.01) |
| G06T 5/50 | (2006.01) |
| G06T 7/593 | (2017.01) |
| H04N 7/18 | (2006.01) |
| G06T 7/254 | (2017.01) |
| G06T 7/55 | (2017.01) |

(Continued)

(52) U.S. Cl.
CPC ............. *H04N 5/2224* (2013.01); *G06T 5/50* (2013.01); *G06T 7/215* (2017.01); *G06T 7/254* (2017.01); *G06T 7/292* (2017.01); *G06T 7/55* (2017.01); *G06T 7/596* (2017.01); *H04N 5/222* (2013.01); *H04N 5/232* (2013.01); *H04N 5/247* (2013.01); *H04N 7/181* (2013.01); *G06T 2207/10016* (2013.01)

(58) Field of Classification Search
CPC ...... H04N 5/2224; H04N 5/232; H04N 7/181; G06T 7/292; G06T 5/50; G06T 7/596
See application file for complete search history.

(56) References Cited

U.S. PATENT DOCUMENTS

| | | | | |
|---|---|---|---|---|
| 8,610,787 | B2 * | 12/2013 | Namba ..................... | G02B 7/28 348/142 |
| 9,818,234 | B2 * | 11/2017 | Nezamabadi ......... | G02F 1/1334 |
| 10,451,410 | B2 * | 10/2019 | Hibi ....................... | G01B 11/02 |

(Continued)

FOREIGN PATENT DOCUMENTS

JP 2014215828 A 11/2014

*Primary Examiner* — Amir Alavi

(74) *Attorney, Agent, or Firm* — Rossi, Kimms & McDowell LLP

(57) ABSTRACT

Highly accurate estimation results are obtained even though cameras used for shape estimation of an object are distributed in accordance with a plurality of points of interest. The image processing apparatus of the present invention includes: an estimation unit configured to estimate an object shape of an object within a multi-viewpoint video image captured by each of a plurality of camera groups in units of camera groups; and an integration unit configured to integrate estimation results of the object shapes estimated in units of camera groups based on a camera map indicating a position relationship between common image capturing areas in each of the plurality of camera groups.

14 Claims, 11 Drawing Sheets

(51) Int. Cl.
*H04N 5/247* (2006.01)
*G06T 7/215* (2017.01)

(56) References Cited

U.S. PATENT DOCUMENTS

| | | | |
|---|---|---|---|
| 2015/0276379 A1* | 10/2015 | Ni | G06T 7/564 |
| | | | 382/154 |
| 2016/0345837 A1* | 12/2016 | Takama | A61B 6/0414 |
| 2017/0032569 A1* | 2/2017 | Rondao Alface | G06T 17/00 |
| 2017/0064290 A1* | 3/2017 | Beardsley | H04N 5/2252 |
| 2018/0367709 A1* | 12/2018 | Takama | H04N 5/2224 |
| 2019/0098277 A1* | 3/2019 | Takama | G06T 7/70 |
| 2019/0253639 A1* | 8/2019 | Takama | G06T 15/20 |

\* cited by examiner

IMAGE PROCESSING APPARATUS, OBJECT SHAPE ESTIMATION METHOD, AND STORAGE MEDIUM

BACKGROUND OF THE INVENTION

Field of the Invention

The present invention relates to a method of estimating a shape of an object based on a video image obtained by capturing an object from a plurality of directions and virtual viewpoint information.

Description of the Related Art

A technique is attracting attention, which generates a virtual viewpoint video image by which it is possible to view a highlight scene of soccer or basketball from various angles. The virtual viewpoint video image is a video image viewed from a camera (virtual camera) that does not actually exist but arranged virtually in a three-dimensional space, and the virtual viewpoint video image technique is expected as video image representation with a high feeling of being at a live performance in sports broadcasting and the like. Japanese Patent Laid-Open No. 2014-215828 has disclosed a technique to generate and display an arbitrary virtual viewpoint video image by arranging a plurality of cameras so as to surround the same range and by using a video image obtained by capturing the same range.

Here, in a wide space, for example, such as a stadium, there is a case where a point of interest is set at a plurality of positions (for example, in the case where the image capturing scene is a match of soccer, a total of three positions: in front of each of the goals and the field center). The point of interest is typically a point at which the optical axes of a camera group intersect. In the case where cameras are assigned in a distributed manner at a plurality of points of interest as described above, the number of cameras per point of interest is reduced, and therefore, there is a possibility that the shape estimation accuracy of an object is reduced compared to the case where all the camera are caused to face one point of interest. Concerning this respect, it is possible to prevent the shape estimation accuracy from being reduced by increasing the number of cameras in accordance with the number of points of interest, but in this case, the time required for transmission processing and shape estimation processing of captured video image data becomes long.

SUMMARY OF THE INVENTION

The image processing apparatus according to the present invention is an image processing apparatus including: an estimation unit configured to estimate an object shape based on a first plurality of captured images captured by a first camera group that captures a first point of interest and a second plurality of captured images captured by a second camera group that captures a second point of interest different from the first point of interest; and an output unit configured to output estimation results of the object shape estimated by the estimation unit.

Further features of the present invention will become apparent from the following description of exemplary embodiments with reference to the attached drawings.

DESCRIPTION OF THE EMBODIMENTS

In the following, embodiments of the present invention are explained with reference to the drawings. The following embodiments are not intended to limit the present invention and all combinations of features explained in the present embodiments are not necessarily indispensable to the solution of the present invention.

First Embodiment

In the present embodiment, an aspect is explained in which an object shape in the entire field is estimated by performing distributed processing of shape estimation of an object and performing processing to integrate individual estimation results based on a camera map in a virtual viewpoint video image system having two camera groups performing image capturing with different points of interest. For convenience of explanation, explanation is given on the assumption that the point of interest in the present embodiment is a point at which the optical axes of the cameras belonging to the camera group intersect. However, there is a case the optical axis deviates, and therefore, some errors are permitted.

Figure 1:
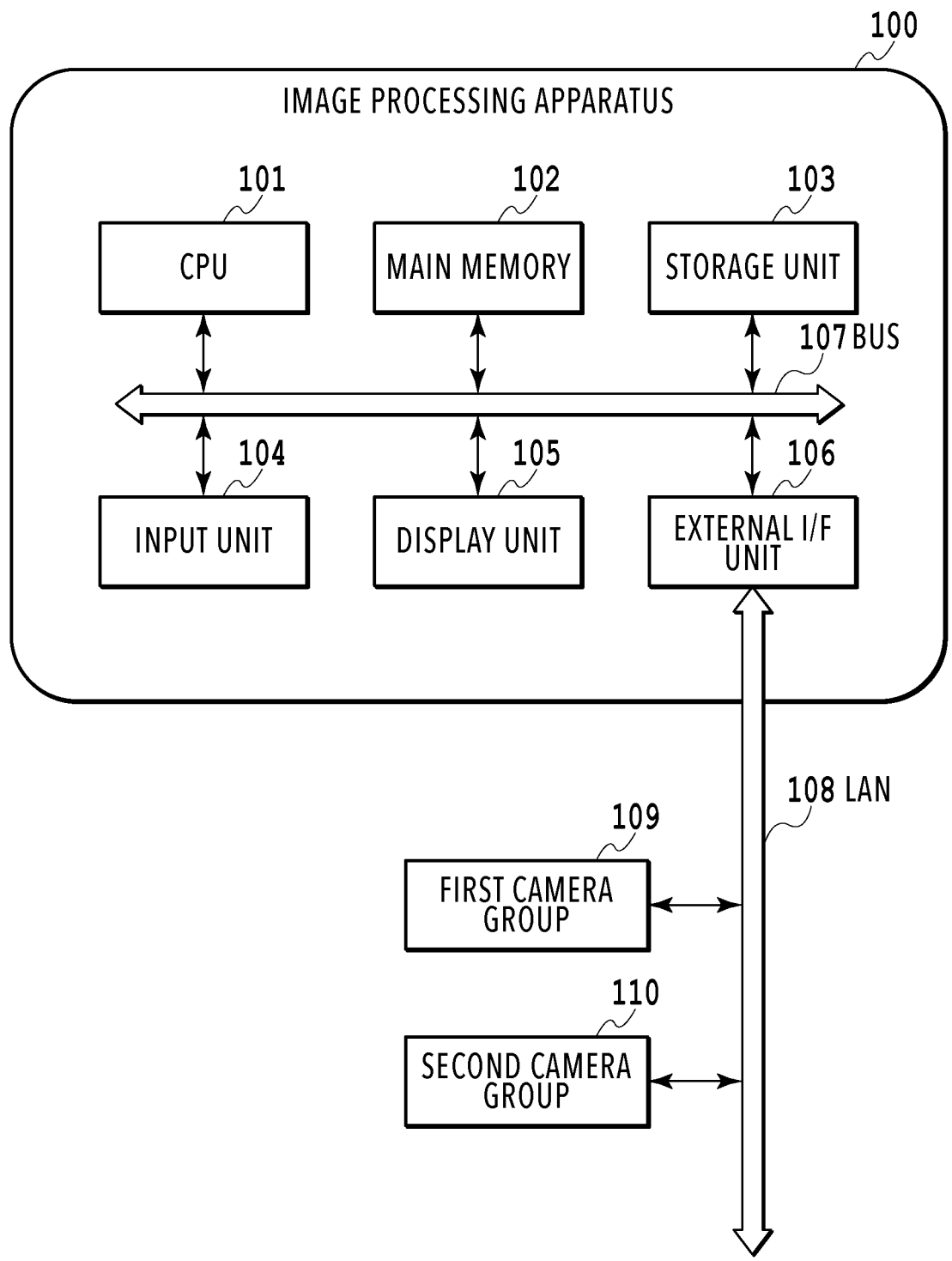
FIG. 1 is a diagram showing an example of a configuration of a virtual viewpoint video image system.

FIG. 1 is a diagram showing an example of a configuration of a virtual viewpoint video image system in the present embodiment. The virtual viewpoint video image system shown in FIG. 1 includes an image processing apparatus 100 and two kinds of camera group, that is, a first camera group 109 and a second camera group 110. Then, the image processing apparatus 100 includes a CPU 101, a main memory 102, a storage unit 103, an input unit 104, a display unit 105, and an external I/F unit 106 and each unit is connected via a bus 107. First, the CPU 101 is a central processing unit configured to centrally control the image processing apparatus 100 and performs various kinds of processing by executing various programs stored in the storage unit 103 and the like. The main memory 102 provides a work area to the CPU 101 as well as temporarily storing data, parameters, and so on used for various kinds of processing. The storage unit 103 is a large-capacity storage device for storing various programs and various kinds of data necessary for a GUI (Graphical User Interface) display and as the storage unit 103, for example, a nonvolatile memory, such as a hard disk and a silicon disk, is used. The input unit 104 is a device, such as a keyboard, a mouse, an electronic pen, and a touch panel, and receives an operation input from a user. The display unit 105 includes a liquid crystal panel and the like and produces a GUI display for path setting of a virtual camera at the time of virtual viewpoint video image generation. The external I/F unit 106 is connected with each camera making up each of the camera groups 109 and 110 via a LAN 108 and performs transmission and reception of video image data and control signal data. The bus 107 connects each unit described above and transfers data.

The first camera group 109 and the second camera group 110 perform image capturing with points of interest different from each other. Each camera making up each camera group is connected to the image processing apparatus 100 via the LAN 108. Then, each camera starts and stops image capturing, changes camera settings (shutter speed, aperture stop, and so on), and transfers captured video image data based on control signals from the image processing apparatus 100.

In the system configuration, various components other than those described above exist, but they are not the main purpose of the present invention, and therefore, explanation thereof is omitted.

Figure 2:
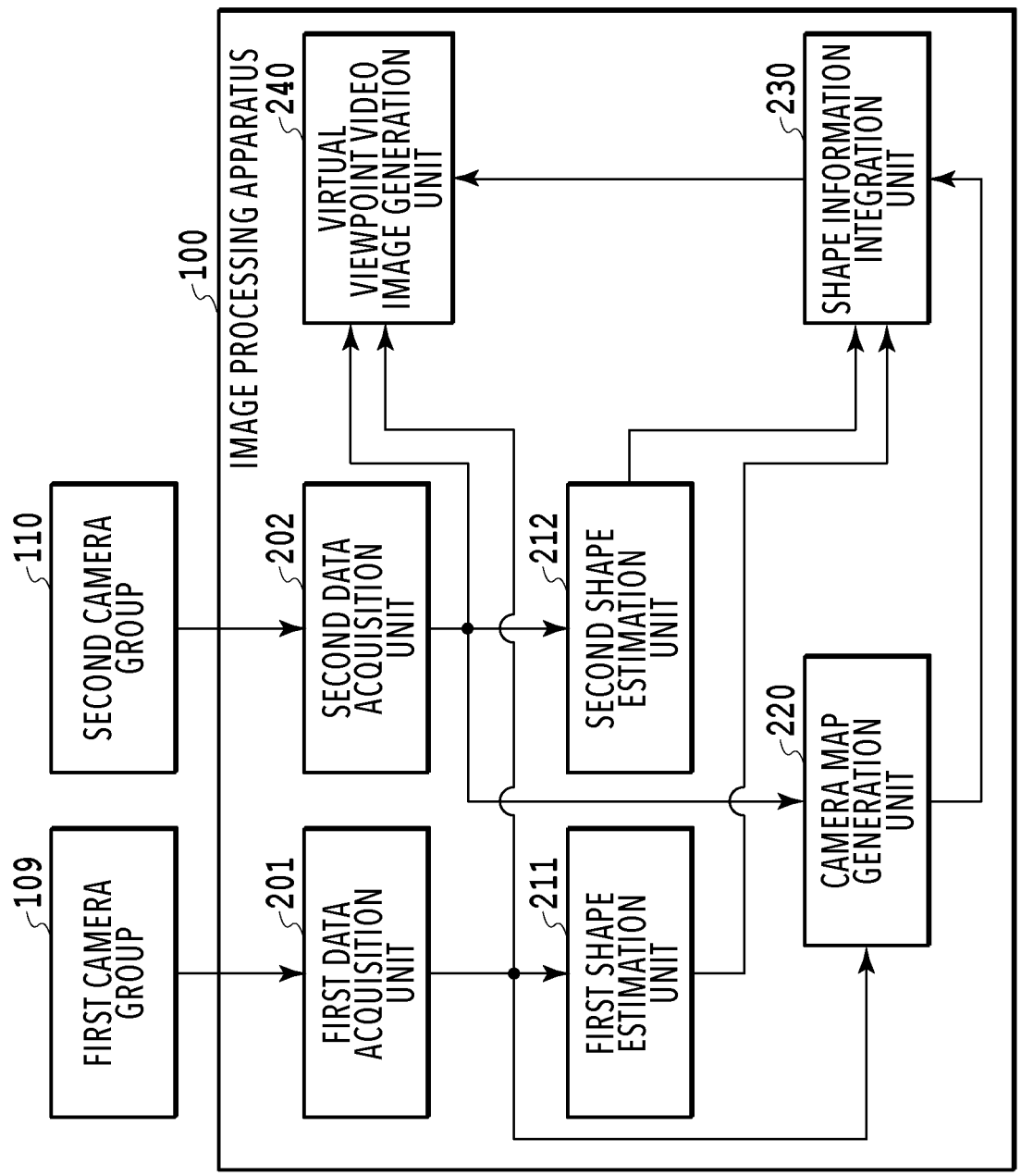
FIG. 2 is a function block diagram showing a software configuration of an image processing apparatus according to an embodiment.

FIG. 2 is a function block diagram showing a software configuration of the image processing apparatus 100 according to the present embodiment. The image processing apparatus 100 acquires the multi-viewpoint video image captured by each of the camera groups 109 and 110 and the parameters of each camera, estimates the three-dimensional shape of an object, and generates a virtual viewpoint video image. The image processing apparatus 100 includes a first data acquisition unit 201, a second data acquisition unit 202, a first shape estimation unit 211, a second shape estimation unit 212, a camera map generation unit 220, a shape information integration unit 230, and a virtual viewpoint video image generation unit 240. Before explaining each unit, arrangement of each camera making up the two camera groups 109 and 110 in the present embodiment is explained.

Figure 3:
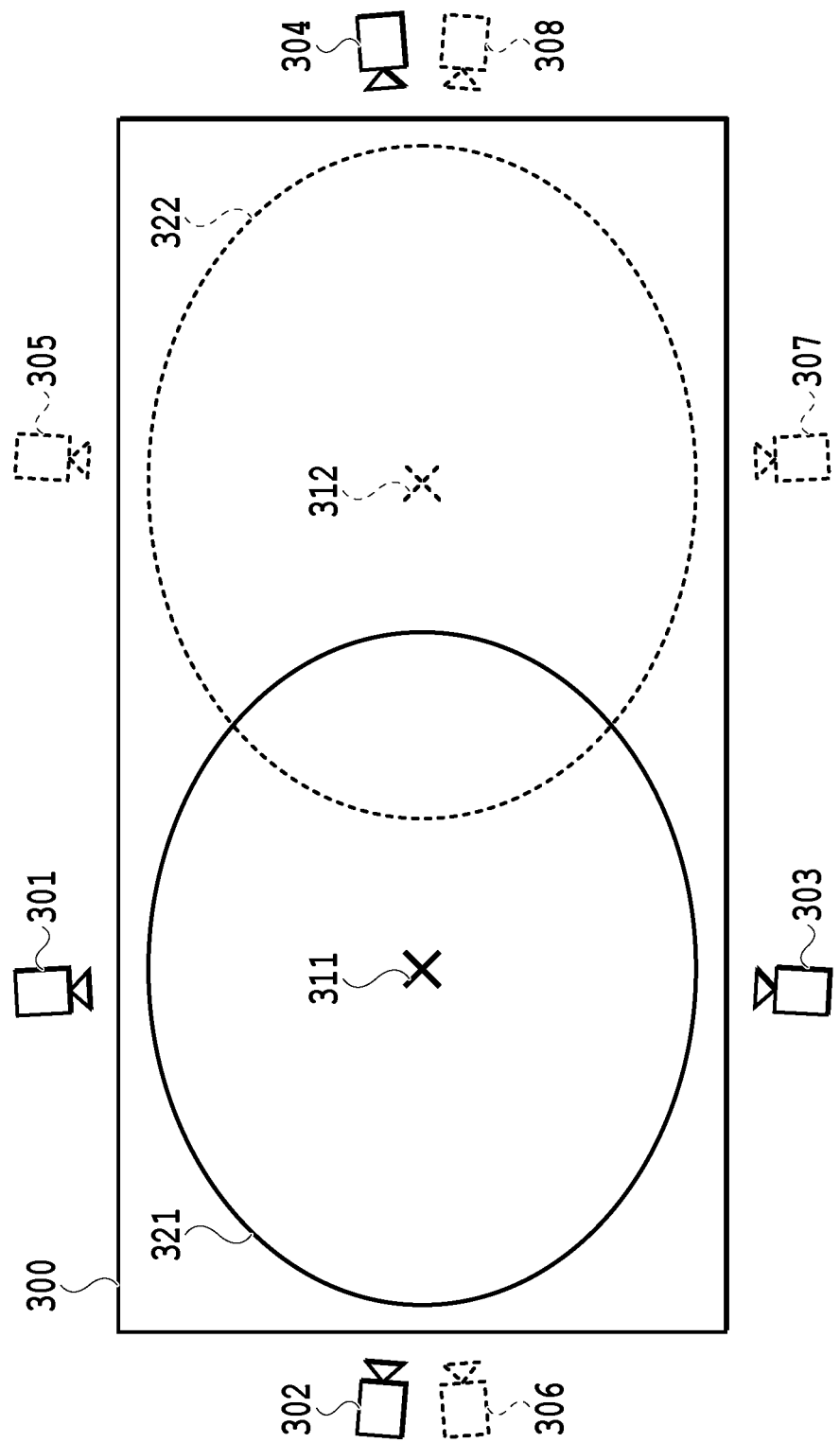
FIG. 3 is a diagram showing an arrangement example of cameras making up camera groups.

FIG. 3 is a diagram showing an arrangement example of cameras making up camera groups. In this example, each camera group is made up of four cameras and a total of eight cameras 301 to 308 are arranged so as to surround a field 300 of soccer and the like. The cameras 301 to 304 indicated by the solid line belong to the first camera group 109 and each of the cameras 301 to 304 is set so as to capture a point 311 of interest. Similarly, the cameras 305 to 308 indicated by the dotted line belong to the second camera group 110 and each of the cameras 305 to 308 is set so as to capture a point 312 of interest. Here, the number of cameras making up each camera group is set to four, but there is no upper limit as long as the number of cameras is two or more.

The first data acquisition unit 201 acquires data of a multi-viewpoint video image (first multi-viewpoint video image) captured by each camera making up the first camera group 109 from the first camera group 109. Further, the first data acquisition unit 201 acquires the camera parameters of each camera making up the first camera group 109 from the storage unit 103. The camera parameters include external parameters representing the position and attitude of the camera and camera-specific internal parameters, such as the focal length and the image center. The data of the first multi-viewpoint video image and the camera parameters of each camera having performed image capturing thereof are sent to the first shape estimation unit 211, the camera map generation unit 220, and the virtual viewpoint video image generation unit 240. The second data acquisition unit 202 acquires data of a multi-viewpoint video image (second multi-viewpoint video image) captured by each camera making up the second camera group 110 from the second camera group 110. Further, the second data acquisition unit 202 acquires the camera parameters of each camera making up the second camera group 110 from the storage unit 103. The second multi-viewpoint video image data and the camera parameters of each camera having performed image capturing thereof are sent to the second shape estimation unit 212, the camera map generation unit 220, and the virtual viewpoint video image generation unit 240.

The first shape estimation unit 211 estimates the three-dimensional shape of an object within the first multi-viewpoint video image. The estimation results are sent to the shape information integration unit 230 as first shape information. Similarly, the second shape estimation unit 212 also estimates the three-dimensional shape of an object based on the second multi-viewpoint video image. The estimation results are sent to the shape information integration unit 230 as second shape information.

The camera map generation unit 220 generates a camera map based on a common image capturing area of each camera making up the first camera group 109 (hereinafter, "first common image capturing area") and a common image capturing area of each camera making up the second camera group 110 (hereinafter, "second common image capturing area"). In the present embodiment, the camera map refers to volume data indicating a correspondence relationship between each voxel dividing an image capturing-target three-dimensional space and each common image capturing area. In FIG. 3 described previously, a solid line ellipse 321 shows the first common image capturing area and a dotted line ellipse 322 shows the second common image capturing area. The generated camera map is sent to the shape information integration unit 230.

The shape information integration unit 230 integrates the first shape information and the second shape information in units of voxels based on the camera map. The shape information on an object obtained by integration (hereinafter, "integrated shape information") is sent to the virtual viewpoint video image generation unit 240.

The virtual viewpoint video image generation unit 240 generates a virtual viewpoint video image in accordance with the virtual camera and the moving path (virtual camera path) of the virtual viewpoint specified via a GUI, not shown schematically, by using the first multi-viewpoint video image data, the second multi-viewpoint video image data, and the integrated shape information, described above.

Figure 4:
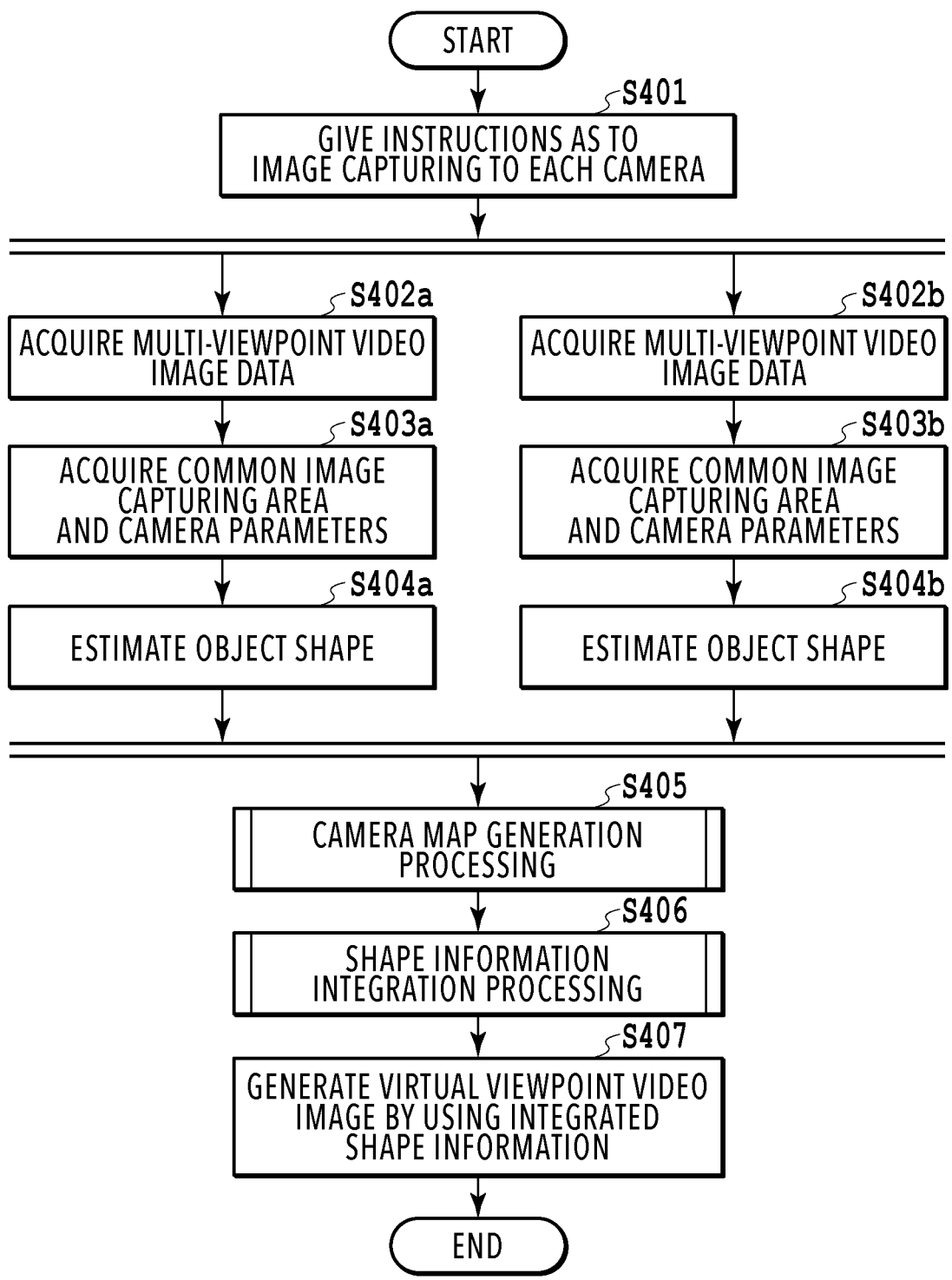
FIG. 4 is a flowchart showing a general flow until a virtual viewpoint video image is generated according to an embodiment.

FIG. 4 is a flowchart showing a general flow until a virtual viewpoint video image is generated in the image processing apparatus 100. This series of processing is implemented by the CPU 101 reading a predetermined program from the storage unit 103, loading the program onto the main memory 102, and executing the program.

At S401, to each camera belonging to the first and second camera groups 109 and 110, image capturing parameters, such as an exposure condition, at the time of image capturing of a multi-viewpoint video image, and a signal to start image capturing are transmitted. Each camera belonging to each camera group starts image capturing in accordance with the received image capturing parameters and stores obtained video image data in a memory within each camera. At S402 to S404 that follow, parallel processing (distributed processing) is performed in units of camera groups. In the following, S402a to S404a for the first camera group 109 are explained as a representative example.

At S402a, the first data acquisition unit 201 acquires the first multi-viewpoint video image data captured from a plurality of viewpoints by using the cameras 301 to 304. The acquired first multi-viewpoint video image data is sent to the first shape estimation unit 211, the camera map generation unit 220, and the virtual viewpoint video image generation unit 240.

Figure 5A:
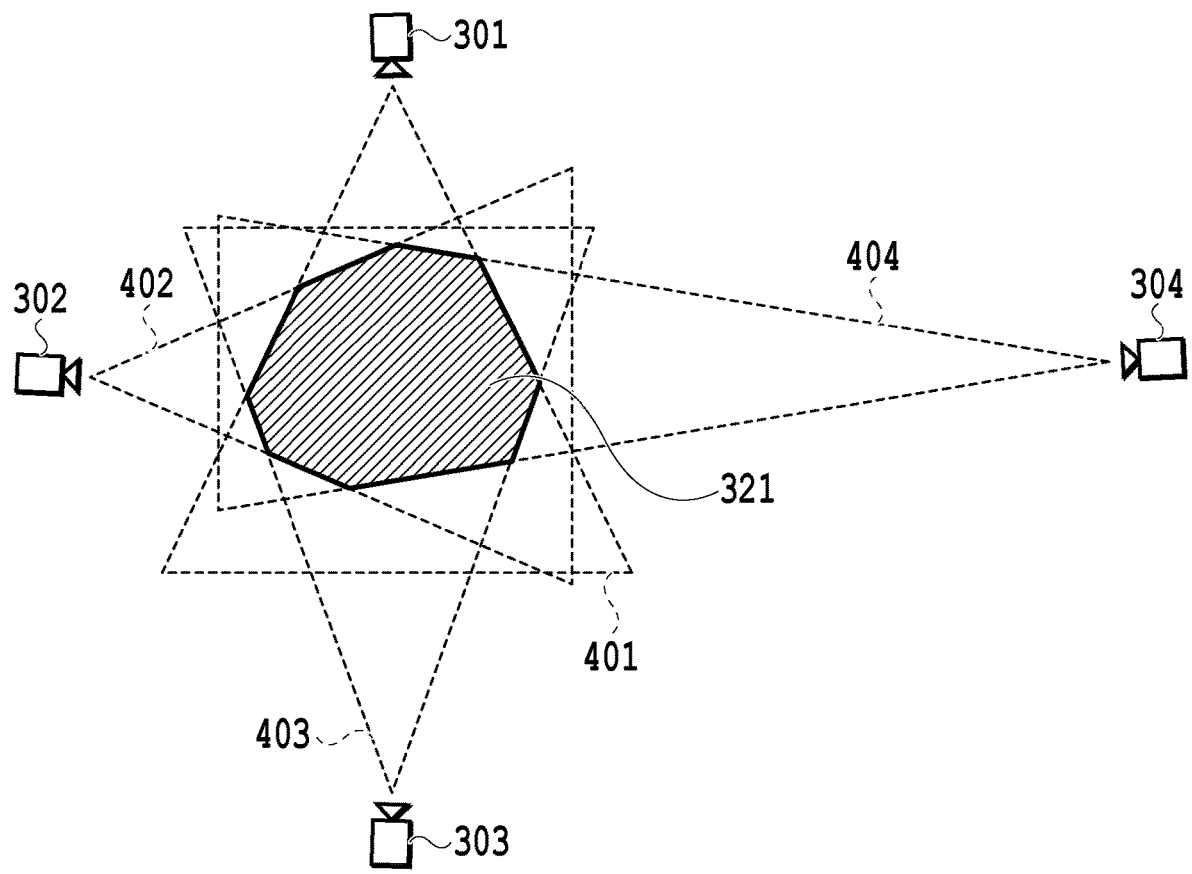
FIG. 5A and FIG. 5B are diagrams explaining a process to find a common image capturing area of camera groups.
Figure 5B:
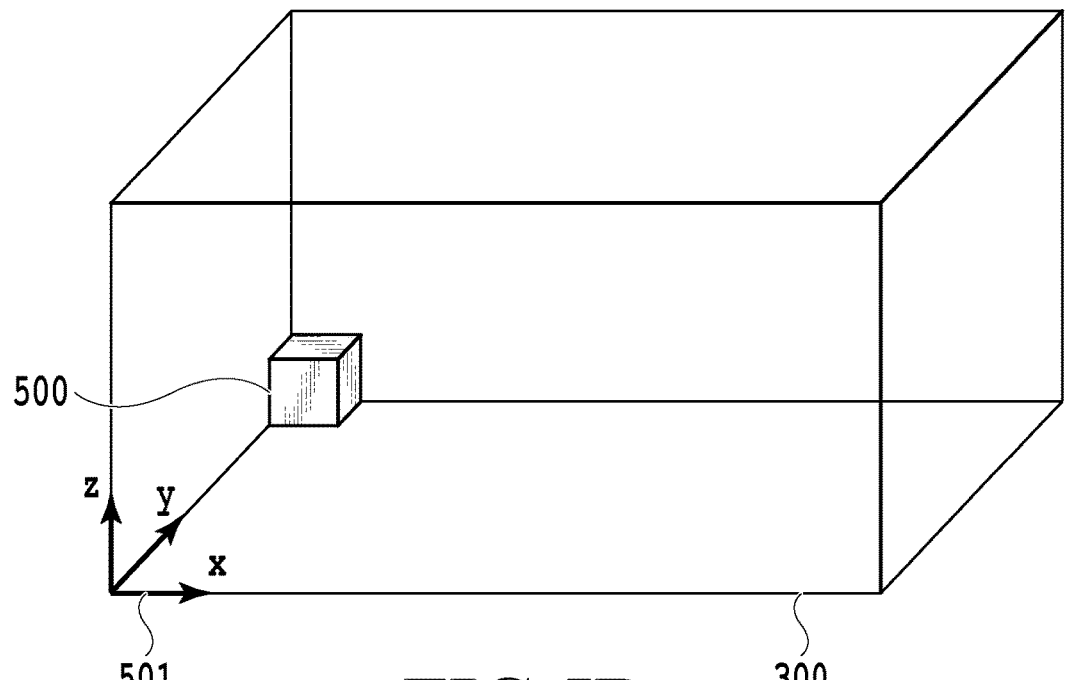

At S403a, the first data acquisition unit 201 acquires information on the first common image capturing area corresponding to the first camera group and the camera parameters of each of the cameras 301 to 304 making up the first camera group 109 from the storage unit 103. Here, it is assumed that the camera parameters and the information on the common image capturing area are found in advance by calibration processing performed before image capturing of a multi-viewpoint video image (at the time of installation of the camera and the like). The camera parameters are found by associating the world coordinates and the image coordinates with each other by performing matching of image feature points between the cameras by using the image feature points detected from the image for calibration. At this time, it may also be possible to use values prepared in advance as the internal parameters, which are camera-specific parameters, and to find only the external parameters representing the position and attitude of the camera from the image data. Further, the common image capturing area of the plurality of cameras is found, for example, as follows. FIG. 5A and FIG. 5B are diagrams explaining a process to find the first common image capturing area of the first camera group 109. In FIG. 5A, triangles (in fact, cones) 401 to 404 indicated by broken lines extending from each of the cameras 301 to 304 represent view volumes of the cameras 301 to 401, respectively. The area (in fact, polyhedron) 321 with diagonal lines where these four view volumes 401 to 404 overlap is the first common image capturing area corresponding to the first camera group 109. In order to find the overlap area 321, as shown in FIG. 5B, volume data obtained by dividing the three-dimensional space of the field 300 by a cube (voxel) 500 having a predetermined volume is prepared first. This volume data is represented by a three-dimensional coordinate system 501 whose x-axis is the long side of the field 300, whose y-axis is the short side of the field 300, with the ground surface of the field 300 being taken as the base surface (z=0). Then, by using the camera parameters of each camera, coordinates (x, y, z) of each voxel are converted into image coordinates (x, y) and whether the converted coordinates (x, y) are within the camera image is determined. After performing this determination processing for all the cameras 301 to 304 making up the first camera group 109, the set of voxels determined to be within the camera images of all the four cameras is the overlap area 321 as the first common image capturing area. The same processing is also performed for the cameras 305 to 308 making up the second camera group 110 and the obtained overlap area is the second common image capturing area. Here, the camera parameters of each of the cameras 301 to 304 found in advance by calibration and the information on the first common image capturing area are acquired, but it may also be possible to acquire by performing calibration after acquisition of multi-viewpoint video image data. The acquired camera parameters and information on the first common image capturing area are sent to the first shape estimation unit 211, the camera map generation unit 220, and the virtual viewpoint video image generation unit 240. Here, the camera parameters found in advance by the calibration processing and the common image capturing area are acquired, but it may also be possible to find each time by using the multi-viewpoint video image acquired at step S402. Further, the derivation method of the common image capturing area is not limited to the above-described method. For example, it may also be possible to take an area captured by three or more cameras of the cameras 301 to 304 making up the first camera group 109 as the first common image capturing area.

At S404a, the first shape estimation unit 211 estimates the three-dimensional shape of an object based on the first multi-viewpoint video image data received from the first data acquisition unit 201. For example, in the case where the image capturing scene is a match of soccer, for example, a player, a ball, and so on are objects. Specifically, first, a silhouette (foreground region) image used for shape estimation is generated from each captured image making up the first multi-viewpoint video image. It is possible to generate the silhouette image by applying a publicly known method, such as a background differential method (the method of calculating a difference between the captured image in which the object is captured and the background image captured in advance and taking the region where the difference is larger than or equal to a threshold value to be the silhouette (foreground region)). Next, by using the silhouette image corresponding to each viewpoint and the camera parameters of the cameras 301 to 304, the three-dimensional shape of the object is estimated. For estimation of the three-dimensional shape, for example, the method of Visual Hull is used. As a result of this processing, volume data representing the three-dimensional shape of an object by a set of voxels is obtained. The value of the voxel making up this volume data is represented by two values and "1" indicates a shape area and "0" indicates a non-shape area. The first shape information as the estimation results is sent to the shape information integration unit 230. Then, the same processing as that at S402a to 404a described above is also performed at S402b to S404b and the second shape information is sent to the shape information integration unit 230.

Figure 6:
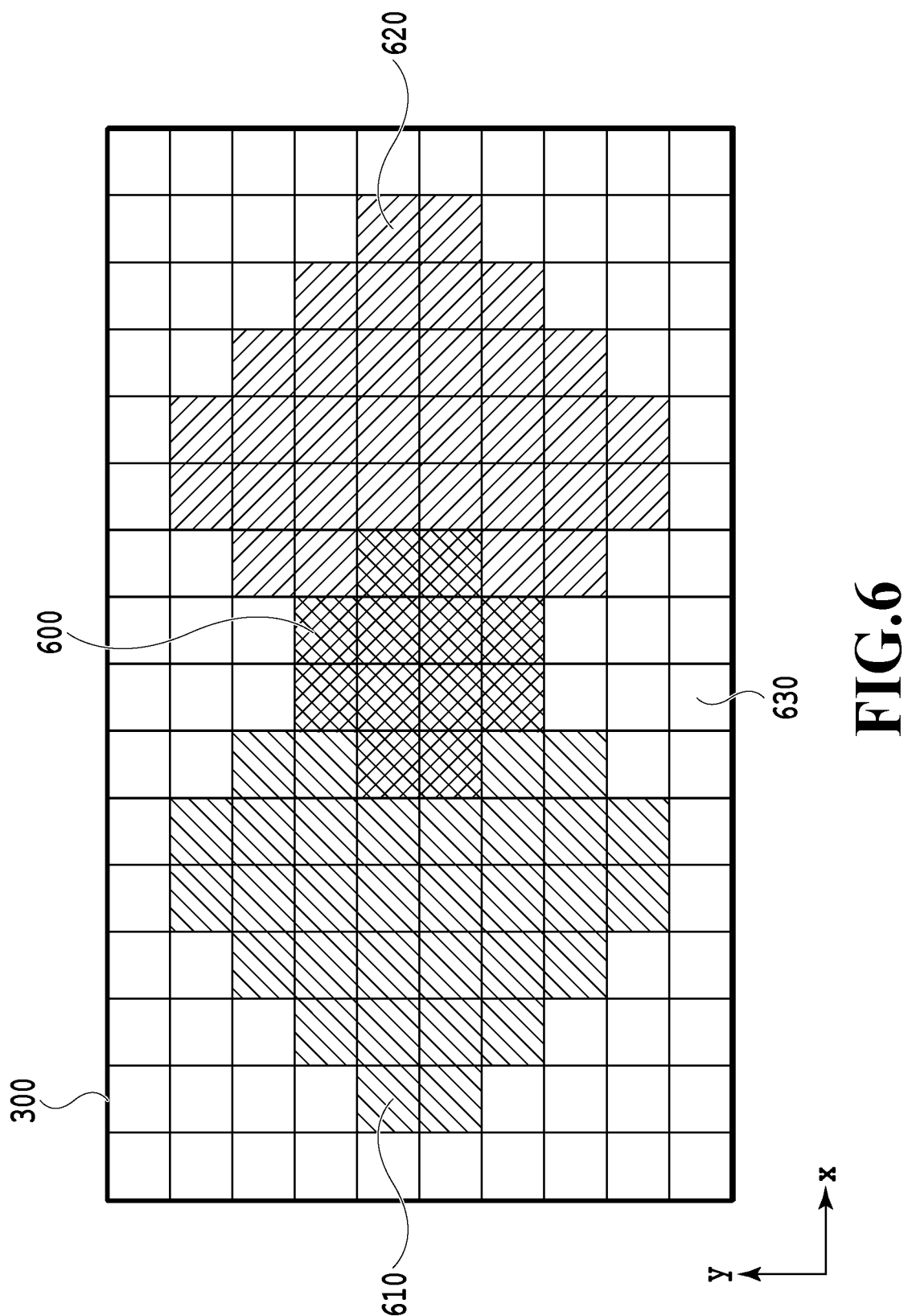
FIG. 6 is a schematic diagram showing an x-y section of a camera map.

At S405, the camera map generation unit 120 generates a camera map indicating the position relationship between both the common image capturing areas by using information on the first common image capturing area and the second common image capturing area. That is, the camera map indicates whether each voxel dividing the three-dimensional space of the field 300 shown in FIG. 3 belongs to the overlap area of the first common image capturing area and the second common image capturing area, belongs only to one of the common image capturing areas, or does not belong to any common image capturing area. This camera map is also represented by volume data having the three-dimensional coordinate system (x, y, z). FIG. 6 is a schematic diagram showing an x-y section (z=0) of the camera map. In FIG. 6, a voxel 600 represented by a diagonal grid indicates a voxel existing in the area where the first common image capturing area and the second common image capturing area overlap. A voxel 610 with diagonal lines extending downward to the right left indicates a voxel existing in the first common image capturing area except for the voxel 600 existing in the above-described overlap area. A voxel 620 with diagonal lines extending downward to the loft right indicates a voxel existing in the second common image capturing area except for the voxel 600 existing in the above-described overlap area. Then, a white voxel 630 indicates a voxel existing in the area that is neither the common image capturing area of the first camera group 109 nor the common image capturing area of the second camera group 110 (or the area that is viewed from the camera not used in the case where the camera to use is limited). Details of the camera map generation processing will be described later. It may also be possible to acquire the camera map at S403 by generating the camera map after finding the common image capturing area by the above-described calibration processing and storing the camera map in the storage area 103. In this case, this step is skipped.

At S406, the shape information integration unit 230 integrates the first shape information received from the first shape estimation unit 211 and the second shape information received from the second shape estimation unit 212 based on the camera map generated at S405. Specifically, for the voxel existing in the area where the first common image capturing area and the second common image capturing area overlap (voxel that is viewed from both the first camera group and the second camera group), a logical product of the first shape information and the second shape information is calculated. Then, for the area of the first common image capturing area and the second common image capturing area except for the above-described overlap area (or the voxel that is viewed only from the first or second camera group), a logical sum of the first shape information and the second shape information is calculated. In this manner, integrated shape information obtained by integrating two kinds of shape information on the same object is generated. Details of the shape information integration processing will be described later.

At S407, the virtual viewpoint video image generation unit 240 generates a virtual viewpoint video image by using the integrated shape information obtained at S406. Specifically, first, the three-dimensional point group indicated by the integrated shape information is colored, and then, a foreground image of the object area is generated by projecting the colored three-dimensional point group onto the image plane of the virtual viewpoint, and next, a background image viewed from the virtual viewpoint is generated, and a virtual viewpoint video image is obtained by superimposing the foreground image on the background image. The above-described generation method is one example and it may also be possible to generate a virtual viewpoint video image by using another method.

The above is the general flow until a virtual viewpoint video image is generated in the image processing apparatus 100 according to the present embodiment. In the present embodiment, explanation is given by the case where there are two camera groups, but it may also be possible to increase the number of viewpoints and to set three or more camera groups. In this case, it is needless to say that the data acquisition unit and the shape estimation unit are added in accordance with the number of camera groups and the parallel processing in units of camera groups at S402 to S404 described above increases in number.

<Camera Map Generation Processing>

Figure 7:
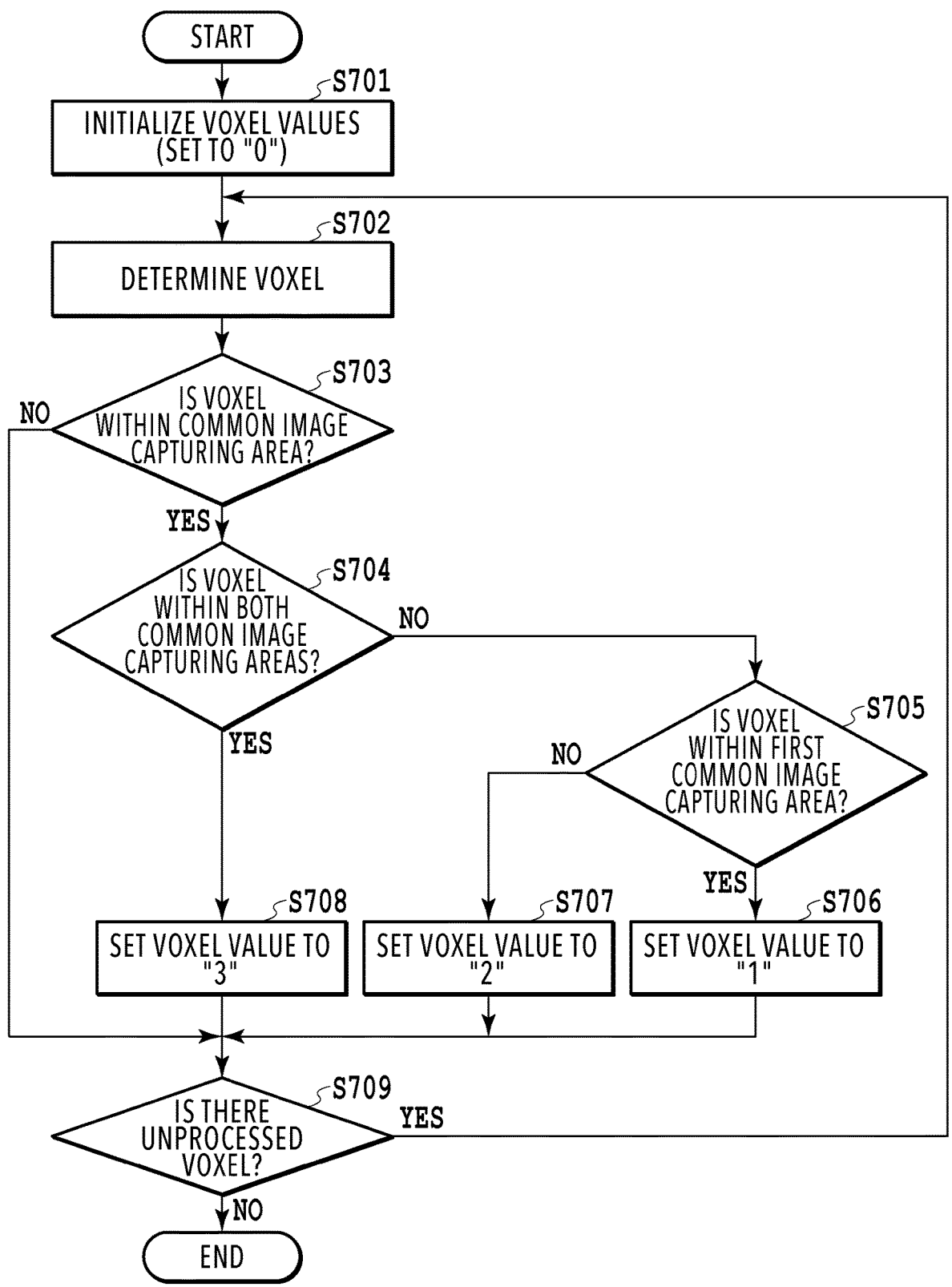
FIG. 7 is a flowchart showing a flow of camera map generation processing.

FIG. 7 is a flowchart showing a flow of the camera map generation processing. In the following, detailed explanation is given along the flow in FIG. 7.

At S701, the voxel values of all the voxels making up the volume data (the same as the volume data used at the time of finding the common image capturing area for each camera group) obtained by dividing the three-dimensional space of the field 300 by the voxel, which is prepared in advance, are initialized (set to "0"). Here, it is assumed that the case where the voxel value is "0" indicates that the voxel does not belong to any common image capturing area of the camera group. At S702 that follows, from all the voxels making up the voxel data, a voxel is determined.

At S703 to S705, the area within the voxel data to which the position (coordinates) of the voxel belongs is specified. First, at S703, whether the position (coordinates) of the voxel is at least within one of the common image capturing areas is determined. In the case where the voxel is included in at least one of the common image capturing areas (in the case where the voxel corresponds to one of the voxels 600, 610, and 620), the processing advances to S704. On the other hand, in the case where the voxel is not included in any of the common image capturing areas (in the case where the voxel corresponds to the voxel 630), the processing advances to S 709. Then, at S704, whether the position of the voxel is within the area where both the common image capturing areas overlap is determined. In the case where the results of the determination indicate that the voxel is included in the overlap area of the first common image capturing area and the second common image capturing area (in the case where the voxel corresponds to the voxel 600), the processing advances to S708. On the other hand, in the case where the voxel is not included in the overlap area (in the case where the voxel does not correspond to the voxel 600), the processing advances to S705. Then, at S705, within which of the common image capturing areas the position of the voxel is included in is determined. In the case where the results of the determination indicate that the position is included in the first common image capturing area (in the case where the voxel corresponds to the voxel 610), the processing advances to S706 and in the case where the position is included in the second common image capturing area (in the case where the voxel corresponds to the voxel 620), the processing advances to step 707.

At S706 to S708, a voxel value in accordance with the position of the voxel is set. Specifically, at S706, a value of "1" indicating that the voxel is one that is viewed only from each of the cameras 301 to 304 belonging to the first camera group 109 is set as the voxel value of the voxel. Similarly, at S707, a value of "2" indicating that the voxel is one that is viewed only from each of the cameras 305 to 308 belonging to the second camera group 110 is set as the voxel value of the voxel. Then, at S708, a value of "3" indicating that the voxel is one that is viewed from both each camera belonging to the first camera group 109 and each camera belonging to the second camera group 110 is set as the voxel value of the voxel.

At S709, whether the processing has been completed for all the voxels making up the voxel data is determined. In the case where there is an unprocessed voxel, the processing returns to S702, and the next voxel is determined to be the voxel and the processing is continued. On the other hand, in the case where the processing of all the voxels has been completed, this processing is terminated.

The above is the contents of the camera map generation processing. Due to this, a camera map (volume data) capable of determining whether a voxel is one that is viewed from the cameras of both the camera groups, one that is viewed only from the cameras of the first camera group, or one that is viewed only from the cameras of the second camera group is obtained.

<Shape Information Integration Processing>

Figure 8:
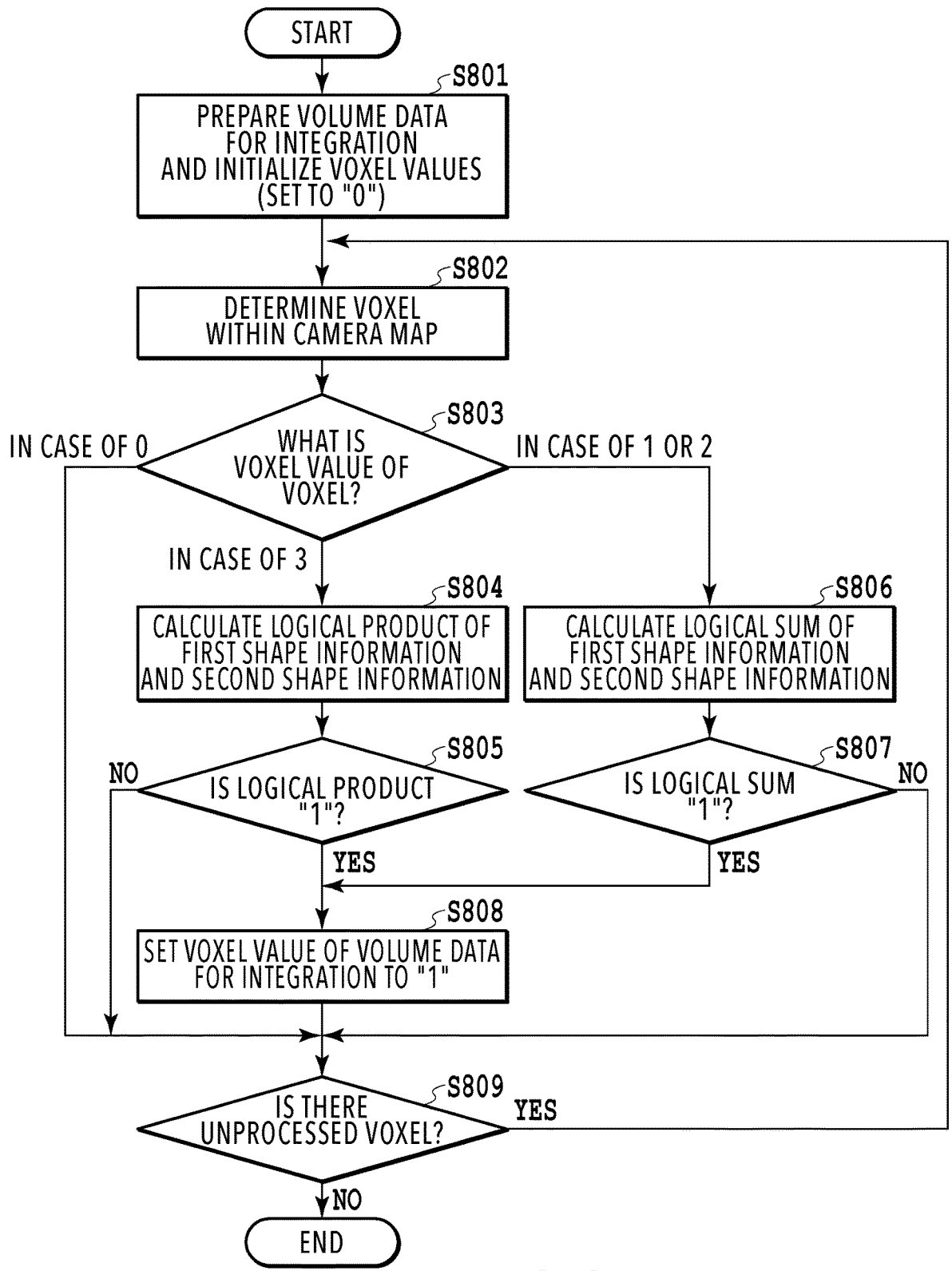
FIG. 8 is a flowchart showing a flow of shape information integration processing.

FIG. 8 is a flowchart showing a flow of the shape information integration processing. In the following, detailed explanation is given along the flow in FIG. 8.

At S801, volume data for integration whose size is the same as that of the camera map is prepared and the voxel values of all the voxels making up the volume data are initialized (set to "0"). It is assumed that the case where the voxel value is "0" indicates that the voxel does not make up the shape of an object. At step S802 that follows, from all the voxels making up the camera map, a voxel is determined.

At S803, the processing is branched according to the voxel values "0 to 3" of the voxel. That is, in the case where the voxel value is "3", the processing advances to S804, in the case where the voxel value is "1" or "2", the processing advances to S806, and in the case where the voxel value is "0", the processing advances to S809.

The case where the voxel value in the camera map is "3" indicates that the voxel is one that is viewed from both the first camera group and the second camera group, and therefore, at S804, the first shape information and the second shape information are referred to and a logical product thereof is calculated. As S805 that follows, the processing is branched according to the results of the calculated logical product. That is, in the case where the calculated logical product is "1", the processing advances to S808 and in the other cases, the processing advances to S809.

The case where the voxel value in the camera map is "1" or "2" indicates that the voxel is one that is viewed from one of the first and second camera groups, and therefore, at S806, the first shape information and the second shape information are referred to and a logical sum thereof is calculated. At S807 that follows, the processing is branched according to the results of the calculated logical sum. That is, in the case where the calculated logical sum is "1", the processing advances to S808 and in the other cases, the processing advances to S809.

At S808, the voxel value of the voxel in the volume data for integration, which has the same coordinates as those of the voxel of the camera map, is set to "1". Thus, the voxel to which "1" is set as the voxel value represents the voxel making up the shape of the object.

At S809, whether the processing has been completed for all the voxels making up the camera map is determined. In the case where there is an unprocessed voxel, the processing returns to S802, and the next voxel is determined to be the voxel and the processing is continued. On the other hand, in the case where the processing of all the voxels has been completed, this processing is terminated.

The above is the contents of the shape information integration processing. As described above, for the voxel within the area where a plurality of common image capturing areas overlaps, a logical product of different pieces of shape information is calculated. Due to this, even in the case where the cameras within the system are divided into a plurality of camera groups and distributed processing of shape estimation is performed, it is possible to obtain the same results as those in the case where shape estimation is performed by using all the cameras within the system. Further, for the voxel in the area where the common image capturing areas do not overlap, a logical sum of different pieces of shape information is calculated. Due to this, it is possible to obtain shape information on the object of the entire field 300 including all the object shapes, that is, the object shape that is captured by the cameras of the first camera group and the object shape that is captured by the cameras of the second camera group. That is, even in the case where the cameras within the system are divided into a plurality of camera groups and distributed processing of shape estimation is performed, it is possible to perform shape estimation of the object by taking the same range as that in the case where all the cameras within the system are used as a target. Further, by dividing the cameras within the system into a plurality of camera groups and adopting distributed processing of shape estimation, it is possible to perform shape estimation more quickly in the case of a scene that occurs at a specific position within the field, for example, such as a penalty kick of soccer. Specifically, for example, by acquiring only the first multi-viewpoint video image corresponding to the point 311 of interest and performing the same integration processing for the voxels whose voxel values of the camera map are "3" and "1", it is possible to reduce the time required for shape estimation by an amount corresponding to a reduction in the amount of the processing-target data.

According to the present embodiment, in the virtual viewpoint video image generation system, a plurality of cameras installed to capture a multi-viewpoint video image is divided into a plurality of camera groups corresponding to each point of interest and shape estimation processing is distributed for each camera group. Then, the shape information generated by each camera group is integrated based on the camera map. Due to this, it is possible to obtain highly accurate shape estimation results while distributing the cameras used for shape estimation of an object. The contents of the shape integration processing are not limited to the above-described method and it is possible to adopt various modification examples. For example, for the voxel within the area where a plurality of common image capturing areas does not overlap, it may also be possible not to perform integration processing. In this case, for example, as the shape of an object (player and the like) existing in the vicinity of the point 311 of interest, the estimation results by the first shape estimation unit 211 are used. Further, as the shape of an object existing in the vicinity of the point 312 of interest, the estimation results by the second shape estimation unit 212 are used. Then, as the shape of an object existing in the vicinity of the middle of the points 311 and 312 of interest, the shape obtained by the logical product of the estimation results by the first shape estimation unit 211 and the estimation results by the second shape estimation unit 212 is used. By doing so, it is possible to reduce the load of the integration processing. Further, in the above-described embodiment, the example is mainly explained in which the integration processing by the logical product is performed for all the voxels within the area where a plurality of common image capturing areas overlaps, but the example is not limited to this. For example, it may also be possible to perform the integration processing only for the voxels within a specific area of the area where a plurality of common image capturing areas overlaps. Further, in the above-described embodiment, explanation is given on the assumption that the common image capturing area is the image capturing area common to all the cameras belonging to one camera group, but the common image capturing area is not limited to this. For example, it may also be possible to take the area captured in common by the number of cameras equal to or larger than a threshold value as the common image capturing area. Further, it may also be possible for a user (operator) who grasps approximate camera arrangement to manually set the common image capturing area, or to preset a predetermined distance (for example, a radius of 20 m) from a point of interest as the common image capturing area. Furthermore, in the above-described embodiment, the example of the case is explained mainly where the shape information integration unit 230 integrates the estimation results by the first shape estimation unit 211 and the estimation results by the second shape estimation unit 212, but the example is not limited to this. For example, it may also be possible to estimate the shape of an object existing in the area where a plurality of common image capturing areas overlaps by using images of a plurality of cameras belonging to the first camera group 109 and the second camera group 110 and to estimate the shape of an object existing in the area where a plurality of common image capturing areas does not overlap by using only images of a plurality of cameras belonging to a single camera group (for example, the first camera group 109). More specifically, the image processing apparatus 100 estimates the shape of an object existing in the area where a plurality of common image capturing areas overlaps as follows. That is, the image processing apparatus 100 estimates the shape of an object based on a first plurality of captured images captured by the first camera group 109 that captures a first point of interest (a point 311 of interest) and a second plurality of captured images captured by the second camera group 110 that captures a second point of interest (a point 312 of interest) different from the point 311 of interest. In this case, the shape information integration unit 230 in FIG. 2 estimates the shape of an object by using data acquired from the first data acquisition unit 201 and the second data acquisition unit 202. According to the image processing apparatus 100 of the present embodiment, the shape of a player (object) is estimated by using images of a plurality of cameras corresponding to a plurality of different points of interest, and therefore, it is possible to obtain highly accurate shape estimation results.

Second Embodiment

Next, an aspect is explained as a second embodiment in which shape estimation results for each camera group are integrated based on priority. Explanation of the contents in common to those of the first embodiment is omitted or simplified and in the following, different points are explained mainly.

Figure 9:
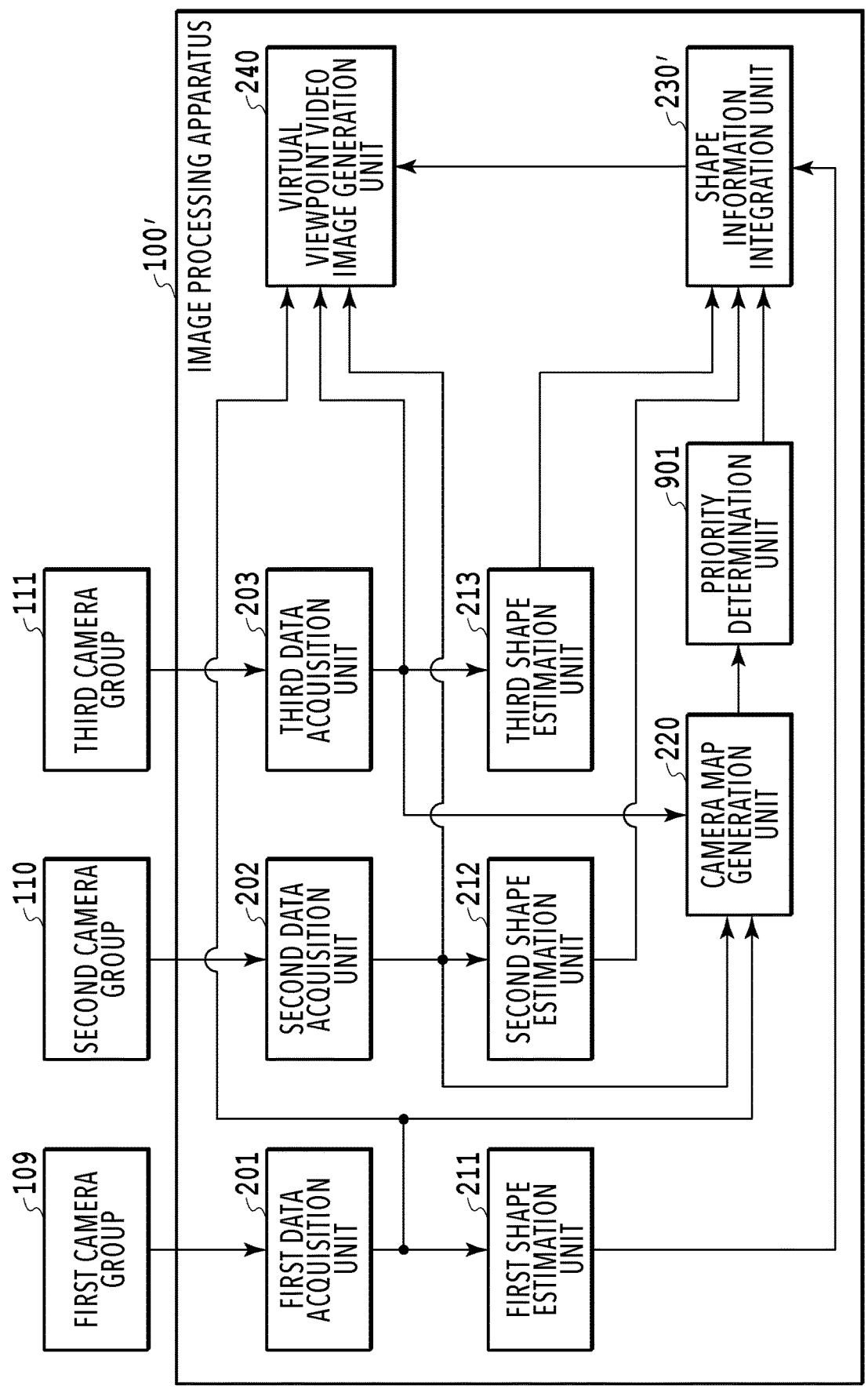
FIG. 9 is a function block diagram showing a software configuration of an image processing apparatus according to an embodiment.
Figure 10:
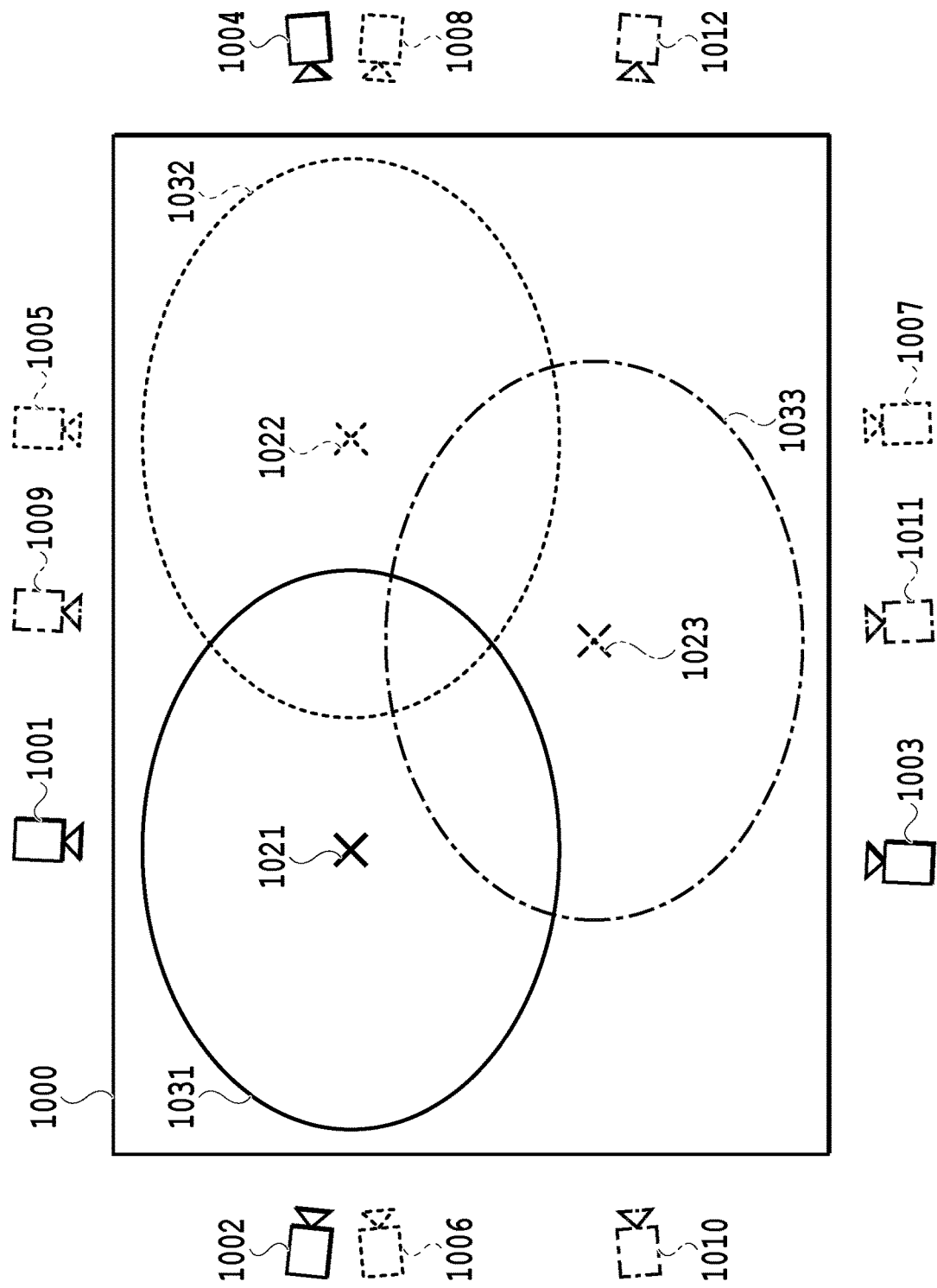
FIG. 10 is a diagram showing an arrangement example of cameras making up camera groups.

FIG. 9 is a function block diagram showing a software configuration of an image processing apparatus 100' according to the present embodiment. The image processing apparatus 100' acquires multi-viewpoint video images captured by three camera groups, that is, the two camera groups 109 and 110 and a camera group 111 and parameters of each camera, estimates the three-dimensional shape of an object, and generates a virtual viewpoint video image. The image processing apparatus 100' has a third data acquisition unit 203 and a third shape estimation unit 213, both corresponding to the third camera group 111, and further, a priority determination unit 901, in addition to each processing unit shown in FIG. 2. FIG. 10 is a diagram showing an arrangement example of cameras making up the three camera groups 109 to 111 in the present embodiment. Each camera group is made up of four cameras and a total of 12 cameras 1001 to 1012 are arranged so as to surround a field 1000 of soccer and the like. The cameras 1001 to 1004 indicated by the solid line belong to the first camera group 109 and each of the cameras 1001 to 1004 is set so as to capture a point 1021 of interest. Similarly, the cameras 1005 to 1008 indicated by the dotted line belong to the second camera group 110 and each of the cameras 1005 to 1008 is set so as to capture a point 1022 of interest. Similarly, the cameras 1009 to 1012 indicated by the one-dot chain line belong to the third camera group 111 and each of the cameras 1009 to 1012 is set so as to capture a point 1023 of interest. The function of each unit other than the priority determination unit 901 is the same as explained in the first embodiment, and therefore, explanation is omitted here.

The priority determination unit 901 determines priority at the time of integrating shape information (first to third shape information) on an object estimated for each camera group based on a camera map generated by the camera map generation unit 220. Then, in a shape information integration unit 230', processing to integrate shape information of each camera group in accordance with the determined priority is performed and integrated shape information is generated.

Figure 11:
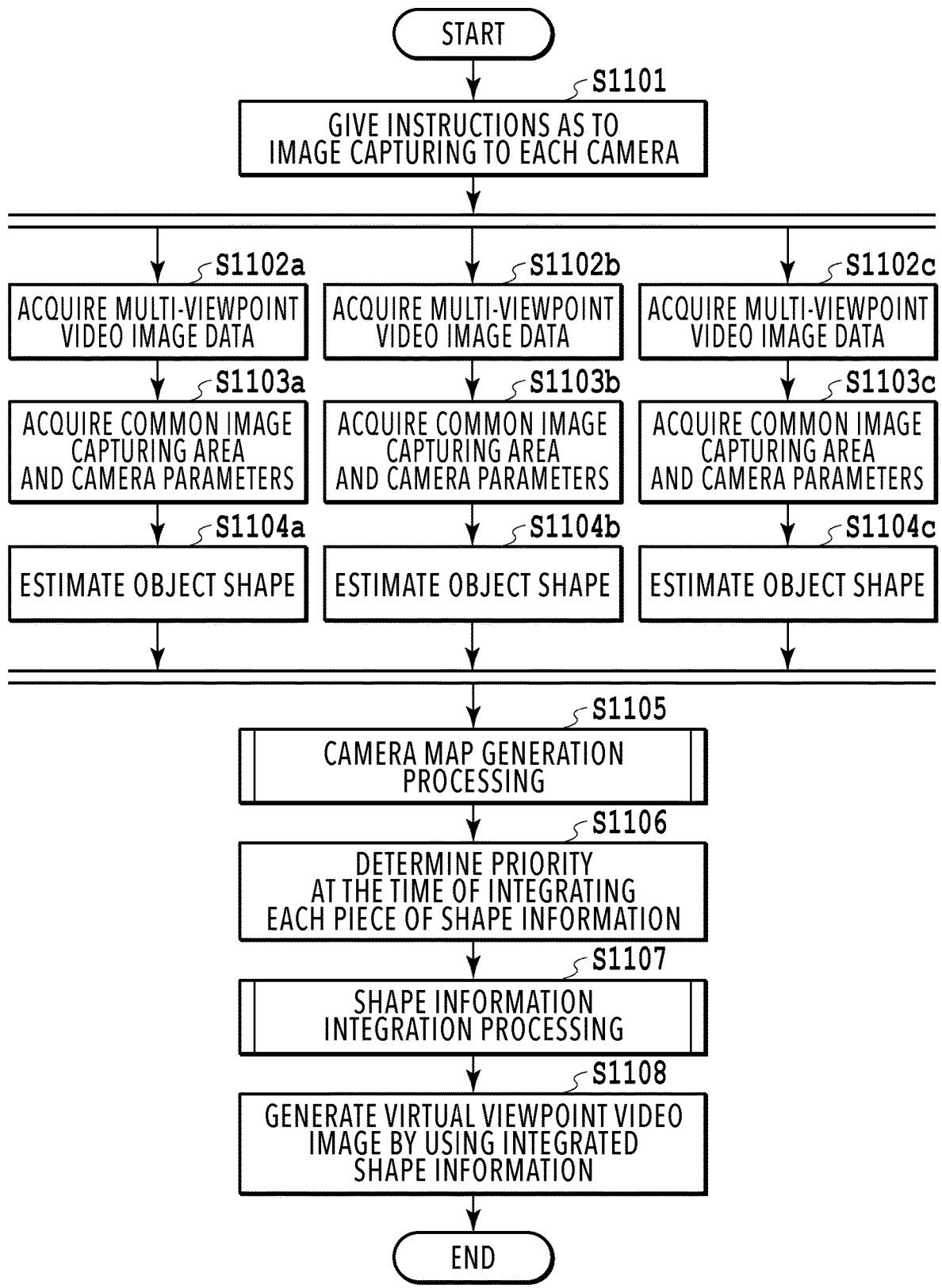
FIG. 11 is a flowchart showing a general flow until a virtual viewpoint video image is generated according to an embodiment.

FIG. 11 is a flowchart showing a general flow until a virtual viewpoint video image is generated in the image processing apparatus 100' of the present embodiment. This series of processing is implemented by the CPU 101 reading a predetermined program from the storage unit 103 and loading the program onto the main memory 102 and then executing the program.

S1101 to S1105 correspond to S401 to S405, respectively, in the flow in FIG. 4 of the first embodiment. That is, an image capturing start signal is transmitted to each camera belonging to the first to third camera groups 109 to 111 (S1101) and image capturing is performed in each camera belonging to each camera group. At S1102 to S1104 that follow, as in the first embodiment, parallel processing (distributed processing) is performed in units of camera groups. Specifically, in each data acquisition unit, multi-viewpoint video image data is acquired (S1102), then, information on a common image capturing area corresponding to each camera group and camera parameters of the cameras making up each camera group are acquired (S1103). Following the above, the three-dimensional shape of an object is estimated in each of the shape estimation units 211 to 213 and first to third shape information corresponding to the first to third camera groups 109 to 111, respectively, is generated (S1104). Then, by using information on the common image capturing area for each of the three camera groups, a camera map is generated (S1105). In the camera map generated in the present embodiment, in the case where the voxel position is within a first common image capturing area 1031, "1" is set to the voxel value, in the case of within a second common image capturing area 1032, "2" is set to the voxel value, and in the case of within a third common image capturing area 1033, "3" is set to the voxel value. Further, in the case where the voxel position is within an overlap area of the first common image capturing area 1031 and the second common image capturing area 1032, "4" is set to the voxel value and in the case of within an overlap area of the second common image capturing area 1032 and the third common image capturing area 1033, "5" is set to the voxel value. Then, in the case where the voxel position is within an overlap area of the third common image capturing area 1033 and the first common image capturing area 1031, "6" is set to the voxel value and in the case of within an area where all the three common image capturing areas 1031 to 1033 overlap, "7" is set to the voxel value. Then, in the case where the voxel position is not included in any common image capturing area, "0" is set to the voxel value.

Next, at S1106, the priority determination unit 901 determines priority at the time of integrating the first to third information estimated for each of the three camera groups based on the camera map generated at S1105. As a determination method in this case, mention is made of a method of determining priority as follows in accordance with the voxel value so that, for example, the smaller the number of common image capturing areas that overlap, the higher priority is given (the voxel viewed from a smaller number of camera groups is given higher priority).

TABLE 1

| Voxel value of camera map | Priority |
| --- | --- |
| 7 | low |
| 4, 5, 6 | medium |
| 1, 2, 3 | high |

By setting priority such as this for each voxel, for example, in the case of generating a virtual viewpoint video image viewed from a bird's eye in a match of sports, by giving priority to shape estimation processing in the entire field, it is possible to efficiently generate a virtual viewpoint video image with few defects in the case where viewed from a bird's eye.

The above-described priority determination method is an example and in addition to this, for example, it may also be possible to determine priority based on the number of objects captured in images captured by each camera group on the assumption that a so-called highlight scene occurs more frequently in the camera group having captured a video image in which the number of objects is larger. In this case, the number of objects is acquired as follows. First, the shape (three-dimensional point set) estimated in each camera group is parallelly projected onto an image plane of z=0. Next, the number of voxels making up the projected shape is counted by the pixels at the portion corresponding to the projected shape. Then, the obtained number of voxels is binarized with an arbitrary threshold value and a binary image is generated. The number of objects is obtained by dividing this binary image into areas by a publicly known method and counting the number of obtained areas. It is possible to calculate the number of objects in an image captured by each camera group by performing the processing such as this for each camera group. Then, higher priority is set to the voxel within the common image capturing area of the camera group having captured the image including the larger number of objects (objects are clustered close together). For example, it is supposed that the number of objects within the first common image capturing area 1031 is ten, the number of objects within the second common image capturing area 1032 is seven, and the number of objects within the third common image capturing area 1033 is four. The priority in this case is as follows.

TABLE 2

| Number of objects for each common image capturing area | Priority |
| --- | --- |
| first common image capturing area: ten | high |
| second common image capturing area: seven | medium |
| third common image capturing area: four | low |

Further, it may also be possible to add up the number of objects in the image captured by each camera group in the combinations of two camera groups each and to give higher priority to the voxel within the common image capturing area relating to the combination of camera groups whose total number of objects is larger. The priority in this case is as follows.

TABLE 3

| Combination of camera groups and total number of objects | Priority |
| --- | --- |
| first + second camera groups: 17 | high |
| second + third camera groups: 11 | low |
| first + third camera groups: 14 | medium |

By setting priority for each voxel as described above, it is possible to efficiently generate a virtual viewpoint video image in the area where the possibility that a highlight scene occurs is strong by giving priority to shape estimation processing in the area (for example, in front of the goal of soccer) where the number of objects is large within the image capturing space field.

Further, it may also be possible to set priority based on the position of an object moving fast on the assumption that a highlight scene occurs around the fast moving object (for example, a ball in a ball game). In this case, for detection of a fast moving object on an image, a publicly known method may be applied. As the detection method, for example, mention is made of a method of using a difference between frames corresponding to three frames in a video image captured by each camera. Then, higher priority is given to the voxel within the common image capturing area of the camera group having captured the video image in which the detected fast moving object is captured and the camera group having captured the video image in which the fast moving object is captured before the video image. By setting priority as described above, it is possible to give priority to shape estimation processing of the object involved in an event that occurs around the object moving fast, such as a soccer ball. Information on priority thus determined is sent to the shape information integration unit 230'.

At S1107, the shape information integration unit 230' integrates the first to third shape information received from the first to third shape estimation units 211 to 213, respectively, based on the camera map generated at S1105 and the priority determined at S1106. As a method of integration based on priority, a method is considered, in which, for example, shape estimation modes in accordance with uses are provided and modes are switched in accordance with set priority. In the following a specific example is shown. Here, as shape estimation modes, two kinds of mode are prepared. One is a mode that gives priority to the processing time, a mode for a user who desires to generate a virtual viewpoint video image in a short time rather than to give priority to image quality. The other one is a mode that gives priority to image quality, a mode for a user who desires to generate a virtual viewpoint video image of high image quality. A user selects one of the modes via a UI screen (not shown schematically) displayed on the display unit 105. In the case where the processing time priority mode is selected, the integration processing is performed by using, for example, only the voxels whose priority is higher than or equal to predetermined priority (for example, "high") (voxels having priority "medium" and "low" are not integrated). As the number of integration processing-target voxels is small, and therefore, the shape estimation processing is completed earlier accordingly. Further, in the case where the image quality priority mode is selected, the integration processing is performed by using, for example, voxels that can be processed within a predetermined time set in advance by a user (for example, voxels whose priority is "high" or "medium"). Alternatively, it may also be possible to perform the integration processing by using all the voxels independently of priority. The shape information on the object integrated in accordance with priority as described above is sent to the virtual viewpoint video image generation unit 240 as integrated shape information.

At S1108, the virtual viewpoint video image generation unit 240 generates a virtual viewpoint video image by using the integrated shape information obtained at S1107.

The above is the general flow until a virtual viewpoint video image is generated in the image processing apparatus 100' according to the present embodiment. In the present embodiment, explanation is given in the case where there are three camera groups, but it may also be possible to further increase the number of points of interest and to set more camera groups. In this case, it is needless to say that the data acquisition unit and the shape estimation unit are added in accordance with the number of camera groups and the parallel processing in units of camera groups at S1102 to S1104 described above increases in number. Further, priority may be determined by the various methods described above.

According to the present embodiment, it is possible to control the number of voxels used for integration processing in accordance with priority at the time of integrating shape information on an object generated in units of camera groups based on a camera map. Due to this, flexible shape estimation in accordance with uses of a user is enabled.

In the above-described explanation, the example is explained mainly in which the object shapes are integrated by using the camera map as shown in FIG. 6. However, the example of the camera map is not limited to the example in FIG. 6. That is, it may also be possible to use information indicating at least the area where image capturing ranges of a plurality of camera groups overlap in place of the camera map as shown in FIG. 6. That is, the camera map may be coordinate data of (vertexes of) an overlap area in place of data in the map format and the object shapes may be integrated by using identification information on the voxel located (at the vertex) in the overlap area.

According to the virtual viewpoint video image generation system of the present embodiment, it is possible to obtain highly accurate shape estimation results even though cameras are distributed at a plurality of set points of interest.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-117813, filed Jun. 15, 2017, which is hereby incorporated by reference wherein in its entirety.

What is claimed is:

1. An image processing apparatus comprising:
    one or more processors; and
    one or more memories storing instructions that, when executed by the one or more processors, cause the image processing apparatus to:
    estimate an object shape based on a first plurality of captured images captured by a first plurality of image capturing apparatuses that capture a first region;
    estimate an object shape based on a second plurality of captured images captured by a second plurality of image capturing apparatuses that capture a second region different from the first region; and
    determine an object shape based on (i) an estimation result of the object shape estimated based on the first plurality of captured images and (ii) an estimation result of the object shape estimated based on the second plurality of captured images.

2. The image processing apparatus according to claim 1, wherein,
    the object shape is determined by integrating the estimation result of the object shape based on the first plurality of captured images and the estimation result of the object shape based on the second plurality of captured images.

3. The image processing apparatus according to claim 2, wherein,
    the estimation result of the object shape based on the first plurality of captured images and the estimation result of the object shape based on the second plurality of captured images are integrated by finding a logical product of the estimation result of the object shape based on the first plurality of captured images and the estimation result of the object shape based on the second plurality of captured images for an overlap area where image capturing areas of the first and second plurality of image capturing apparatuses overlap.

4. The image processing apparatus according to claim 3, wherein the one or more memories further store instructions that, when executed by the one or more processors, cause the image processing apparatus to determine a target object for the integration from a plurality of objects based on each image capturing area of a plurality of image capturing apparatus groups including a first image capturing apparatus group comprising the first plurality of image capturing apparatuses and a second image capturing apparatus group comprising the second plurality of image capturing apparatuses and each position of the plurality of objects.

5. The image processing apparatus according to claim 4, wherein an object located in a first image capturing area where image capturing areas of a predetermined number of image capturing apparatus groups overlap is determined as the target object for the integration and an object located in a second image capturing area where image capturing areas of a number of image capturing apparatus groups larger than the predetermined number overlap is not determined as the target object for the integration.

6. The image processing apparatus according to claim 4, wherein,
an object located in a first area where a predetermined number of objects exists is determined as the target object for the integration and an object located in a second area where a number of objects larger than the predetermined number exists is not determined as the target object for the integration.

7. The image processing apparatus according to claim 2, wherein,
the estimation result of the object shape based on the first plurality of captured images and the estimation result of the object shape based on the second plurality of captured images are integrated by finding a logical sum of the estimation result of the object shape based on the first plurality of captured images and the estimation result of the object shape based on the second plurality of captured images for an area other than an overlap area where image capturing areas of the first and second plurality of image capturing apparatuses overlap.

8. The image processing apparatus according to claim 1, wherein,
an object shape of a first object existing in an overlap area where image capturing areas of the first and second plurality of image capturing apparatuses overlap is determined by using the estimation result of the object shape based on the first plurality of captured images and the second plurality of captured images; and
an object shape of a second object existing in the image capturing area of the first plurality of image capturing apparatuses but not existing in the image capturing area of the second plurality of image capturing apparatuses is determined by using the estimation result of the object shape based on the first plurality of captured images but not using the estimation result of the object shape based on the second plurality of captured images.

9. The image processing apparatus according to claim 1, wherein,
the first region comprises a point at which optical axes of the first plurality of image capturing apparatuses intersect, and
the second region comprises a point at which optical axes of the second plurality of image capturing apparatuses intersect.

10. The image processing apparatus according to claim 1, wherein,
the estimation result of the object shape is represented by data indicating a three-dimensional shape of the object.

11. An image processing apparatus comprising:
one or more processors; and
one or more memories storing instructions that, when executed by the one or more processors, cause the image processing apparatus to:
estimate an object shape based on both a first plurality of captured images captured by a first plurality of image capturing apparatuses that capture a first region and a second plurality of captured images captured by a second plurality of image capturing apparatuses that capture a second region different from the first region in a case where a first mode is selected from a plurality of modes; and
estimate an object shape based on one of the first plurality of captured images and the second plurality of captured images in a case where a second mode is selected from the plurality of modes.

12. The image processing apparatus according to claim 11, wherein,
the first mode is a mode that gives priority to a processing time and the second mode is a mode that gives priority to image quality.

13. A shape estimation method comprising:
estimating an object shape based on a first plurality of captured images captured by a first plurality of image capturing apparatuses that capture a first region;
estimating an object shape based on a second plurality of captured images captured by a second plurality of image capturing apparatuses that capture a second region different from the first region; and
determining an object shape based on (i) an estimation result of the object shape estimated based on the first plurality of captured images and (ii) an estimation result of the object shape estimated based on the second plurality of captured images.

14. A non-transitory computer readable storage medium storing a program for causing a computer to perform:
estimating an object shape based on a first plurality of captured images captured by a first plurality of image capturing apparatuses that capture a first region;
estimating an object shape based on a second plurality of captured images captured by a second plurality of image capturing apparatuses that capture a second region different from the first region; and
determining an object shape based on (i) an estimation result of the object shape estimated based on the first plurality of captured images and (ii) an estimation result of the object shape estimated based on the second plurality of captured images.

* * * * *